United States Patent
Zhou et al.

(10) Patent No.: US 11,910,371 B2
(45) Date of Patent: Feb. 20, 2024

(54) SPATIAL QUASI CO-LOCATION INDICATION FOR CONTROL RESOURCE SET AND DOWNLINK BANDWIDTH PART

(71) Applicant: QUALCOMM Incorporated, San Diego, CA (US)

(72) Inventors: Yan Zhou, San Diego, CA (US); Tao Luo, San Diego, CA (US); Prashanth Haridas Hande, San Diego, CA (US); Wanshi Chen, San Diego, CA (US); Juan Montojo, San Diego, CA (US); Heechoon Lee, San Diego, CA (US); Huilin Xu, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/663,297

(22) Filed: Oct. 24, 2019

(65) Prior Publication Data

US 2020/0137741 A1   Apr. 30, 2020

Related U.S. Application Data

(60) Provisional application No. 62/756,490, filed on Nov. 6, 2018, provisional application No. 62/751,478, filed on Oct. 26, 2018.

(51) Int. Cl.
*H04W 72/044* (2023.01)
*H04W 24/08* (2009.01)
(Continued)

(52) U.S. Cl.
CPC ......... *H04W 72/046* (2013.01); *H04L 5/0092* (2013.01); *H04W 24/08* (2013.01);
(Continued)

(58) Field of Classification Search
CPC . H04W 72/046; H04W 72/042; H04W 24/08; H04W 56/001; H04W 80/02;
(Continued)

(56) References Cited

U.S. PATENT DOCUMENTS 10,841,914 B2 * 11/2020 Liou .................... H04L 5/0094
11,343,840 B2 *  5/2022 Yoon .................... H04L 5/0023
(Continued)

FOREIGN PATENT DOCUMENTS

CN          108111280 A      6/2018
EP           3826403 A1 *    5/2021 ........... H04B 7/0617

OTHER PUBLICATIONS

Hamidi-Sepehr, Fatemeh, Yongjun Kwak, and Debdeep Chatterjee. "5g nr pdcch: Design and performance." 2018 IEEE 5G World Forum (5GWF). IEEE, 2018. (Year: 2018).*

(Continued)

*Primary Examiner* — Sharad Rampuria
(74) *Attorney, Agent, or Firm* — Shumaker & Sieffert, P. A.

(57) ABSTRACT

Certain aspects of the present disclosure provide techniques that may allow a base station and user equipment (UE) to be in agreement on spatial quasi co-location (QCL) assumptions for transmission in certain scenarios. The techniques may be used, for example, to determine QCL assumptions for downlink transmissions sent in an initial control resource set (CORESET) on an initial downlink bandwidth part (BWP) where dedicated signaling of such assumptions may be lacking. In some cases, the techniques may involve a UE determining a beam to use for monitoring for a physical downlink control channel (PDCCH) transmission on the initial CORESET in the initial downlink BWP that lacks dedicated signaling of QCL information and monitoring for the PDCCH on the initial CORESET in the initial BWP (Continued)

using the determined beam. Other aspects and features are also claimed and described.

16 Claims, 12 Drawing Sheets

(51) Int. Cl.
| | |
|---|---|
| H04W 56/00 | (2009.01) |
| H04W 80/02 | (2009.01) |
| H04W 74/08 | (2009.01) |
| H04L 5/00 | (2006.01) |
| H04W 72/23 | (2023.01) |

(52) U.S. Cl.
CPC ......... H04W 56/001 (2013.01); H04W 72/23 (2023.01); H04W 74/0833 (2013.01); H04W 80/02 (2013.01)

(58) Field of Classification Search
CPC . H04W 74/0833; H04W 48/12; H04W 72/04; H04W 72/12; H04W 76/00; H04L 5/0092; H04L 5/001; H04L 5/0048; H04L 5/0025; H04L 5/0053; H04B 7/0695; H04B 7/088; H04B 7/2121; H04B 7/2123; H04J 2203/0069; H04Q 2213/394
See application file for complete search history.

(56) References Cited

U.S. PATENT DOCUMENTS

| | | | | |
|---|---|---|---|---|
| 11,540,158 | B2* | 12/2022 | Zhou | H04L 5/001 |
| 11,758,412 | B2* | 9/2023 | Matsumura | H04W 24/10 370/329 |
| 2018/0192383 | A1 | 7/2018 | Nam et al. | |
| 2018/0279135 | A1 | 9/2018 | Hwang et al. | |
| 2019/0149365 | A1* | 5/2019 | Chatterjee | H04L 5/0092 370/329 |
| 2019/0239093 | A1* | 8/2019 | Zhang | H04W 72/046 |
| 2020/0052769 | A1* | 2/2020 | Cirik | H04L 1/0026 |
| 2020/0100311 | A1* | 3/2020 | Cirik | H04B 7/0695 |
| 2020/0267571 | A1* | 8/2020 | Park | H04L 5/0051 |
| 2020/0288479 | A1* | 9/2020 | Xi | H04B 7/088 |
| 2021/0058136 | A1* | 2/2021 | Yang | H04B 7/0695 |
| 2021/0314038 | A1* | 10/2021 | Matsumura | H04B 7/0602 |
| 2021/0336685 | A1* | 10/2021 | Cirik | H04B 7/0695 |

OTHER PUBLICATIONS

Lin, Xingqin, et al. "5G new radio: Unveiling the essentials of the next generation wireless access technology." IEEE Communications Standards Magazine 3.3 (2019): 30-37. (Year: 2019).*
Rico-Alvariño, Alberto, et al. "3GPP Rel-17 Extensions for 5G Media Delivery." IEEE Transactions on Broadcasting 68.2 (2022): 422-438. (Year: 2022).*
Takeda, Kazuki, et al. "Understanding the heart of the 5G air interface: An overview of physical downlink control channel for 5G new radio." IEEE Communications Standards Magazine 4.3 (2020): 22-29. (Year: 2020).*
Liu, Jin, et al. "Initial access, mobility, and user-centric multi-beam operation in 5G new radio." IEEE Communications Magazine 56.3 (2018): 35-41. (Year: 2018).*
QUALCOMM Incorporated: "QCL Indicate of CORESET 0 in Initial DL BWP for BWP Option 1", Jul. 24, 2018, San Diego, 5 pages.
International Search Report and Written Opinion—PCT/US2019/058106—ISA/EPO—dated Jan. 28, 2020.
Nokia, et al., "Beam Management—QCL Association Between DL RS and DMRS for NR-PDCCH", 3GPP TSG RAN WG1 Meeting #89, 3GPP Draft; R1-1708910, 3rd Generation Partnership Project (3GPP), Mobile Competence Centre; 650, Route Des Lucioles; F-06921 Sophia-Antipolis Cedex; France; vol. RAN WG1, No. Hangzhou; May 15, 2017-May 19, 2017, May 14, 2017 (May 14, 2017), 4 PAges, XP051274088, Retrieved from the Internet: URL: http://www.3gpp.org/ftp/Meetings_3GPP_SYNC/RAN1/Docs/ [retrieved on May 14, 2017] the whole document.
Panasonic: "QCL Related Issues During BWP Switching", 3GPP TSG-RAN WG1 Meeting #93, 3GPP Draft; R1-1806390, 3rd Generation Partnership Project (3GPP), Mobile Competence Centre, 650, Route Des Lucioles; F-06921 Sophia-Antipolis Cedex, France, vol. RAN WG1, No. Busan, Korea; May 21, 2018-May 25, 2018, pp. 1-3, May 20, 2018 (May 20, 2018), XP051441595, Retrieved from the Internet: URL: http://www.3gpp.org/ftp/Meetings_3GPP_SYNC/RAN1/Docs/[retrieved on May 20, 2018] Sections 1, 2 and 2.1.
QUALCOMM Incorporated: "Remaining Details on QCL", 3GPP TSG RAN WG1 Meeting #91,3GPP Draft, 3GPP TSG RAN WG1 Meeting #91, R1-1720672, 3rd Generation Partnership Project (3GPP), Mobile Competence Centre, 650, Route Des Lucioles, F-06921 Sophia-Antipolis Cedex, France, vol. RAN WG1, No. Reno, Nevada, USA; Nov. 27, 2017-Dec. 1, 2017, Nov. 18, 2017 (Nov. 18, 2017), pp. 1-9, XP051370133, Retrieved from the Internet: URL: http://www.3gpp.org/ftp/tsg_ran/WG1_RL1/TSGR1_91/Docs/, http://www.3gpp.org/ftp/tsg_ran/WG1_RL1/TSGR1_91/Docs/ [retrieved on Nov. 18, 2017] sections 1-3, the whole document.
Samsung: "On Beam Management, Measurement and Reporting", 3GPP TSG RAN WG1 Meeting #91, 3GPP Draft; R1-1720290_V1, 3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Nov. 17, 2017 (Nov. 17, 2017), XP051368939, 15 Pages, Retrieved from the Internet: URL: http://www.3gpp.org/ftp/tsg_ran/WG1_RL1/TSGR1_91/Docs/, http://www.3gpp.org/ftp/tsg_ran/WG1_RL1/TSGR1_91/Docs/,[retrieved on Nov. 17, 2017], Sections 2.1, 2.4, Proposal 7, p. 1, paragraph 2.1—p. 3, paragraph2.3.
Panasonic: "QCL Related Issues During BWP Switching", 3GPP TSG-RAN WG1 Meeting 93, R1-1806390, Busan, Korea, May 21-25, 2018, 2 Pages, Section 2.
Taiwan Search Report—TW108138596—TIPO—dated Nov. 13, 2022 1 Page.
CATT: "Open Issues and Corrections for NR PDCCH", 3GPP TSG RAN WG1 Meeting #94bis, R1-1810520, Chengdu, China, Oct. 8-12, 2018, XP051517928, 6 Pages.
Ericsson: "Feature Lead Summary 2 on Beam Measurement and Reporting", 3GPP TSG RAN WG1 Meeting #92b, R1-1805574, 3rd Generation Partnership Project, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 19, 2018, XP051427757, 29 Pages.

* cited by examiner

SPATIAL QUASI CO-LOCATION INDICATION FOR CONTROL RESOURCE SET AND DOWNLINK BANDWIDTH PART

PRIORITY CLAIMS

This application claims priority to and the benefit of U.S. Provisional Application No. 62/751,478, filed on Oct. 26, 2018, and 62/756,490, filed on Nov. 6, 2018, both of which are expressly incorporated by reference in their entirety as if fully set forth below and for all applicable purposes.

TECHNICAL FIELD

Aspects of the present disclosure relate to wireless communications, and more particularly, to techniques for providing an indication of spatial quasi co-location (QCL) information related to control and bandwidth information (e.g., for an initial control resource set (CORESET) and initial bandwidth part (BWP)).

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a network entity. The method generally includes signaling information regarding a beam for a physical downlink control channel (PDCCH) transmission on an initial control resource set (CORESET) in an initial downlink bandwidth part (BWP) that lacks dedicated signaling of quasi co-location (QCL) information and transmitting the PDCCH to a user equipment (UE) on the initial CORESET in the initial BWP using the beam.

Certain aspects provide a method for wireless communication performed by a user equipment (UE). The method generally includes determining a beam to use for monitoring for a physical downlink control channel (PDCCH) transmission on an initial control resource set (CORESET) in an initial downlink bandwidth part (BWP) that lacks dedicated signaling of quasi co-location (QCL) information and monitoring for the PDCCH on the initial CORESET in the initial BWP using the determined beam.

Certain aspects of the present disclosure provide a method for wireless communication by a network entity. The method generally includes signaling information regarding a beam for a physical downlink control channel (PDCCH) transmission on a control resource set (CORESET) in a first downlink bandwidth part (BWP) that lacks dedicated signaling of quasi co-location (QCL) information and transmitting the PDCCH to a user equipment (UE) on the CORESET in the first BWP using the beam.

Certain aspects provide a method for wireless communication performed by a user equipment (UE). The method generally includes determining a beam to use for monitoring for a physical downlink control channel (PDCCH) transmission on a control resource set (CORESET) in a first downlink bandwidth part (BWP) that lacks dedicated signaling of quasi co-location (QCL) information and monitoring for the PDCCH on the CORESET in the first BWP using the determined beam.

In yet other aspects, a method of wireless communication for a UE can include using multiple BWPs. For example, a UE can determine a beam to use for monitoring a PDCCH transmission on a CORESET based on at least one of one or more BWPs (e.g., a first or second BWP). In some instances, a first BWP may lack dedicated QCL signaling so a UE may look to a second BWP for appropriate QCL signaling. Once a UE determines an appropriate beam, the UE can monitor for a PDCCH via the CORESET. Further, in some instances, the CORESET may be an initial CORESET.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
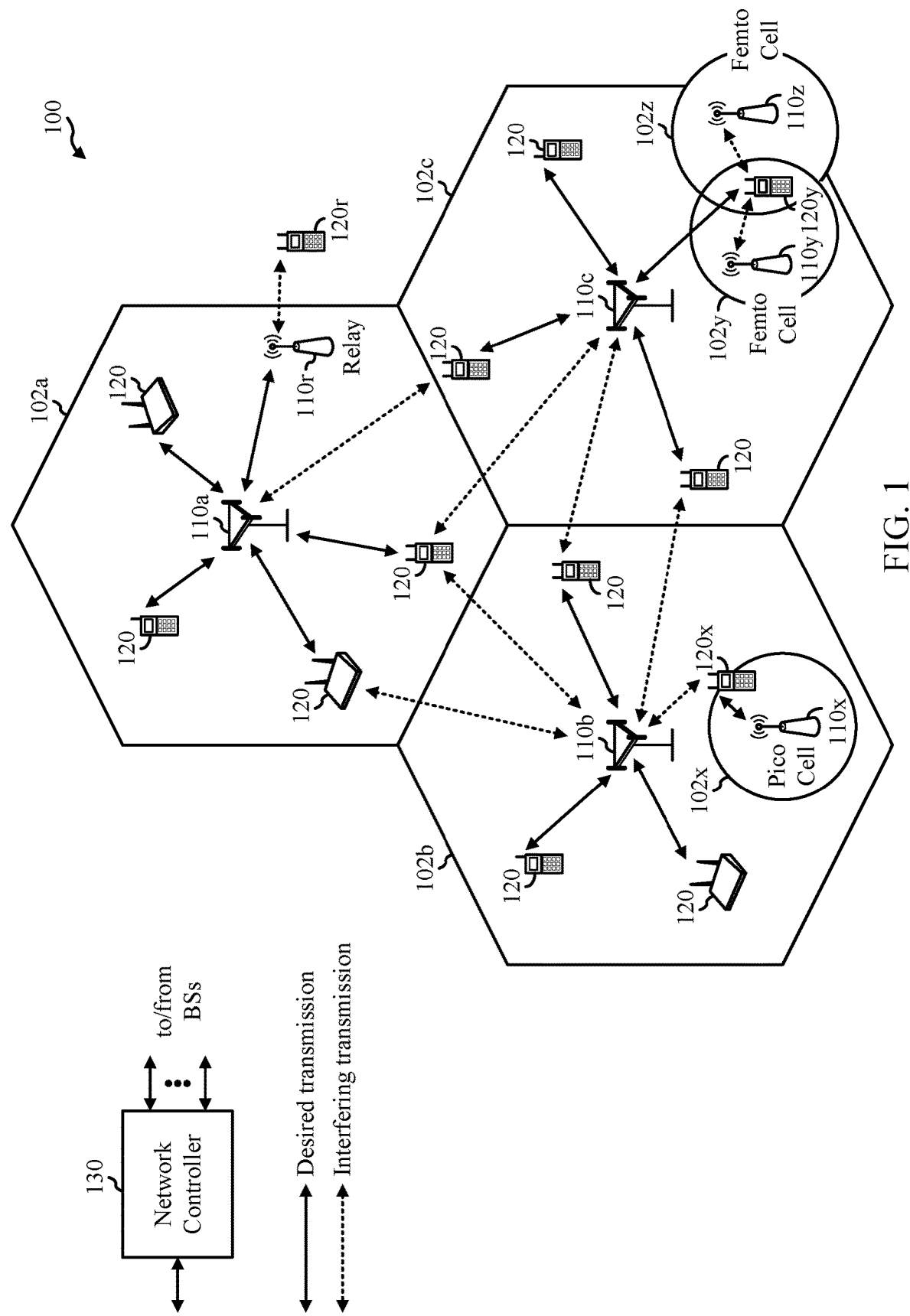
FIG. 1 is a block diagram conceptually illustrating an example telecommunications system, in accordance with certain aspects of the present disclosure.

Aspects of the present disclosure provide apparatus, devices, methods, processing systems, and computer readable mediums for configuring, sharing, and/or exchanging control and/or bandwidth information. In some scenarios control information can be a control resource set (CORESET) used for access of a network by a UE. Deployment options can include configuring a CORESET (e.g., an initial and/or first CORESET) during beam management, beam training, and/or beam recovery. In certain aspects, an initial CORESET may be referred to as CORESET #0 (e.g., corresponding to CORESET #0 as defined in 3GPP standards defining NR).

CORESET information may be provided in one or more bandwidth parts. In some instances, a first or initial bandwidth part may be a downlink bandwidth part that does not have (or lacks) quasi co-location information. In other scenarios, another bandwidth part (e.g., second and/or supplemental) may have quasi co-location information. Further a search space associated with a CORESET (e.g., initial and/or first CORESET) may be referred to as a search space #0. Though some discussion herein relates to initial control information used to establish connections between a NW/BS and other devices, embodiments may be used in other scenarios where control information is being transmitted to establish communication links.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured to perform operations 1000 of FIG. 10 to determine spatial quasi co-location (QCL) information. In some cases, the UE may use the determined spatial QCL information to process a physical downlink control channel (PDCCH) transmission sent in an initial CORESET on an initial BWP. Similarly, a base station 110 (e.g., a gNB) may be configured to perform operations 1100 of FIG. 11 to signal the spatial QCL information to the UE 120 and transmit the PDCCH in the initial CORESET and initial downlink BWP. In other instances, supplemental and/or follow-up control and bandwidth information may also be used relative to first or initial control and bandwidth information (e.g., in addition to, to replace, or to substitute as may be desired).

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
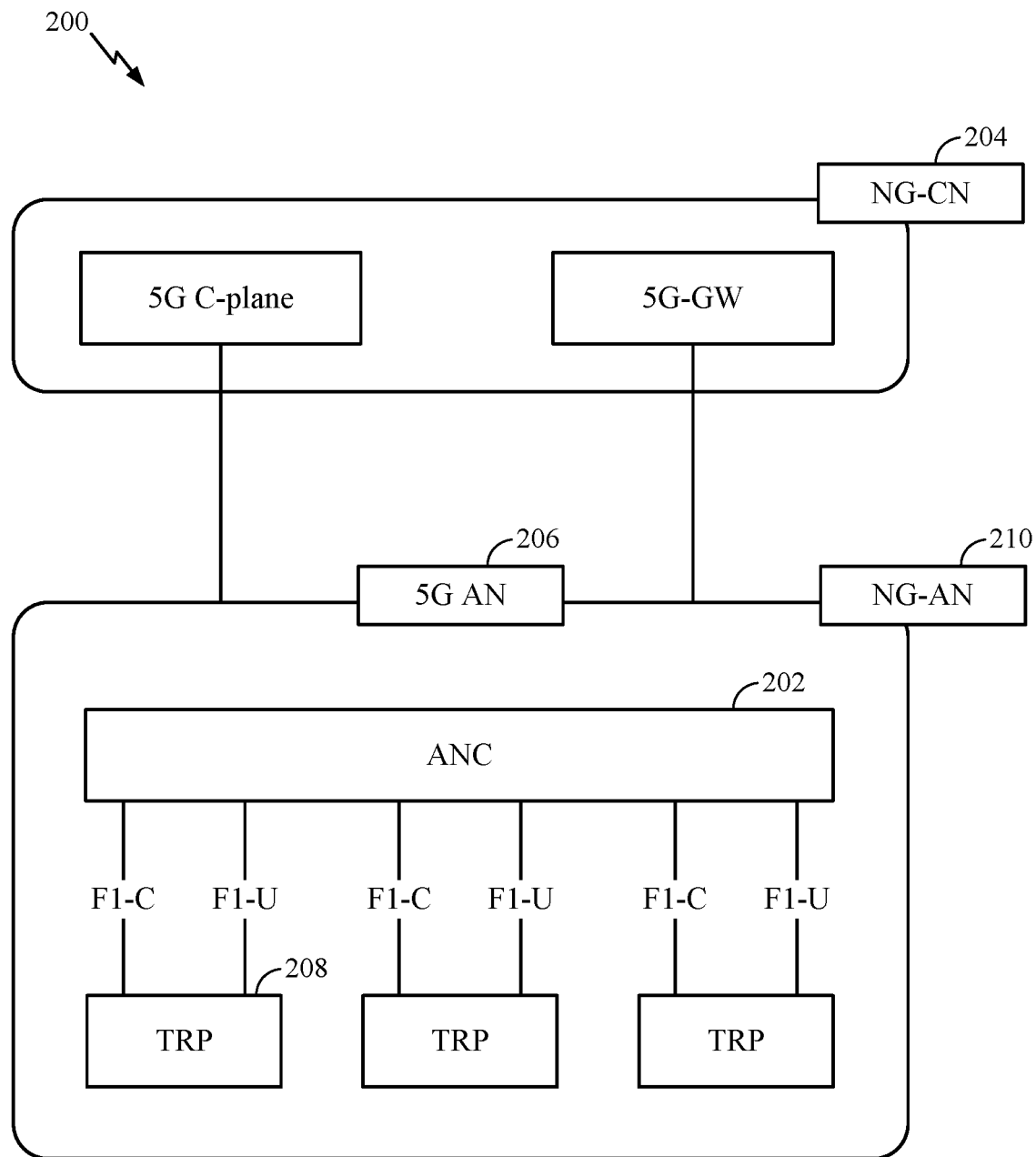
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
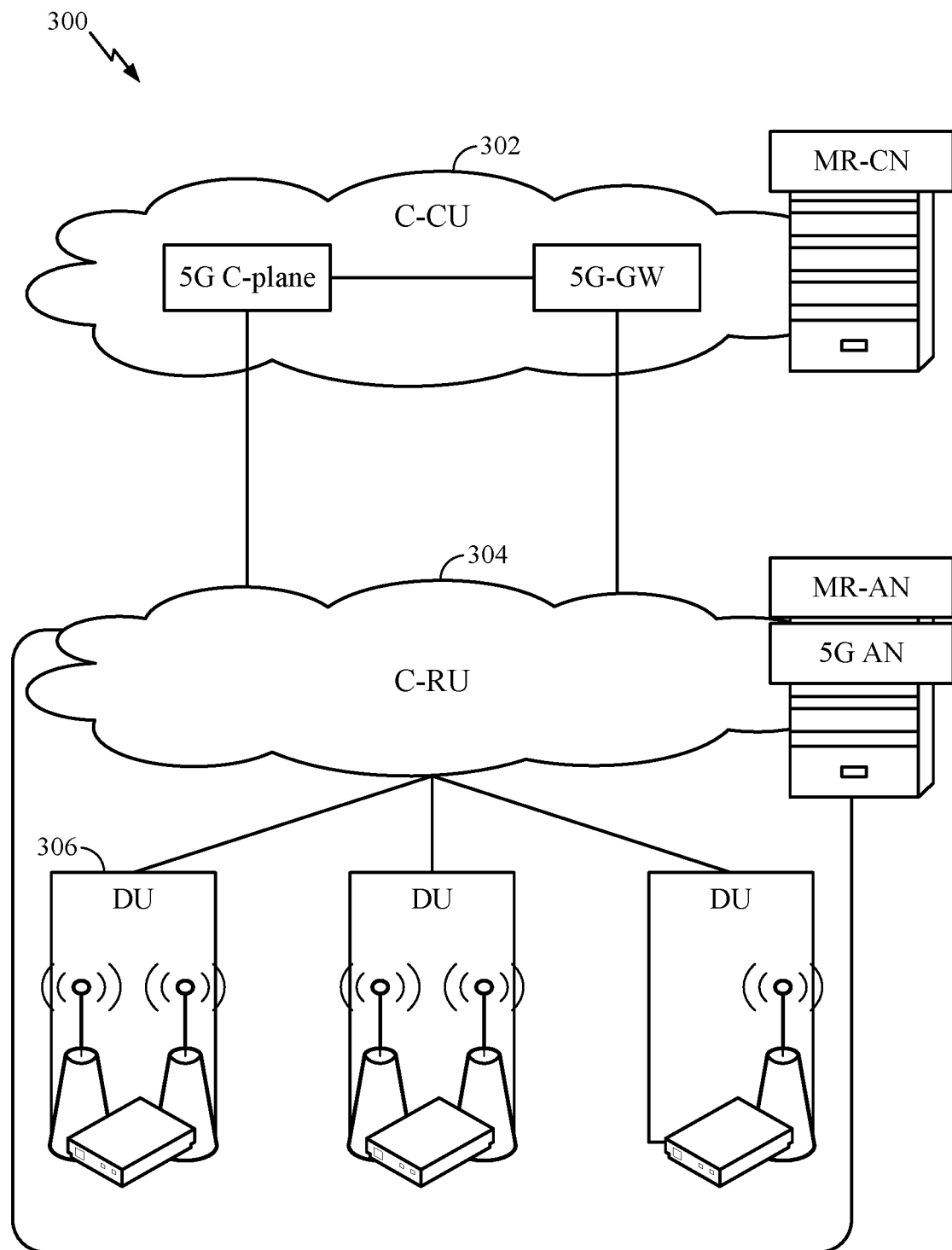
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
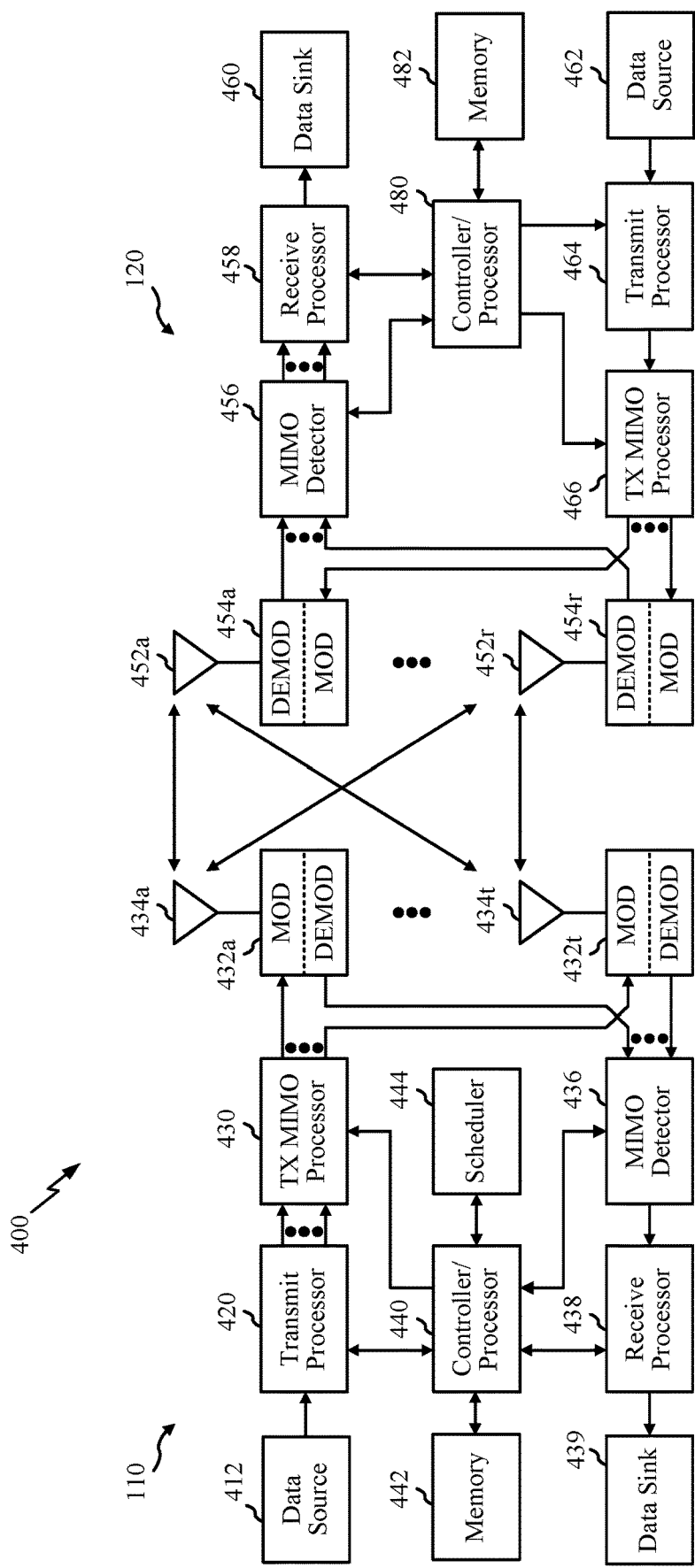
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform operations 1000 of FIG. 10, while antennas 434, processors 420, 460, 438, and/or controller/processor 440 of the BS 110 may be used to perform operations 1100 of FIG. 11.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, antennas 452a through 452r may receive downlink signals from the base station 110 and may provide received signals to demodulators (DEMODs) in transceivers 454a through 454r, respectively. Each demodulator 454 may condition (e.g., filter, amplify, down convert, and digitize) a respective received signal to obtain input samples. Each demodulator may further process input samples (e.g., for OFDM, etc.) to obtain received symbols. A MIMO detector 456 may obtain received symbols from all demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct operations at the base station 110 and the UE 120, respectively. The processor 440 and/or other processors and modules at the BS 110 may perform or direct execution of processes for techniques described herein. The memories 442 and 482 may store data and program codes for BS 110 and UE 120, respectively. A scheduler 444 may schedule UEs for data transmission on the downlink and/or uplink.

Figure 5:
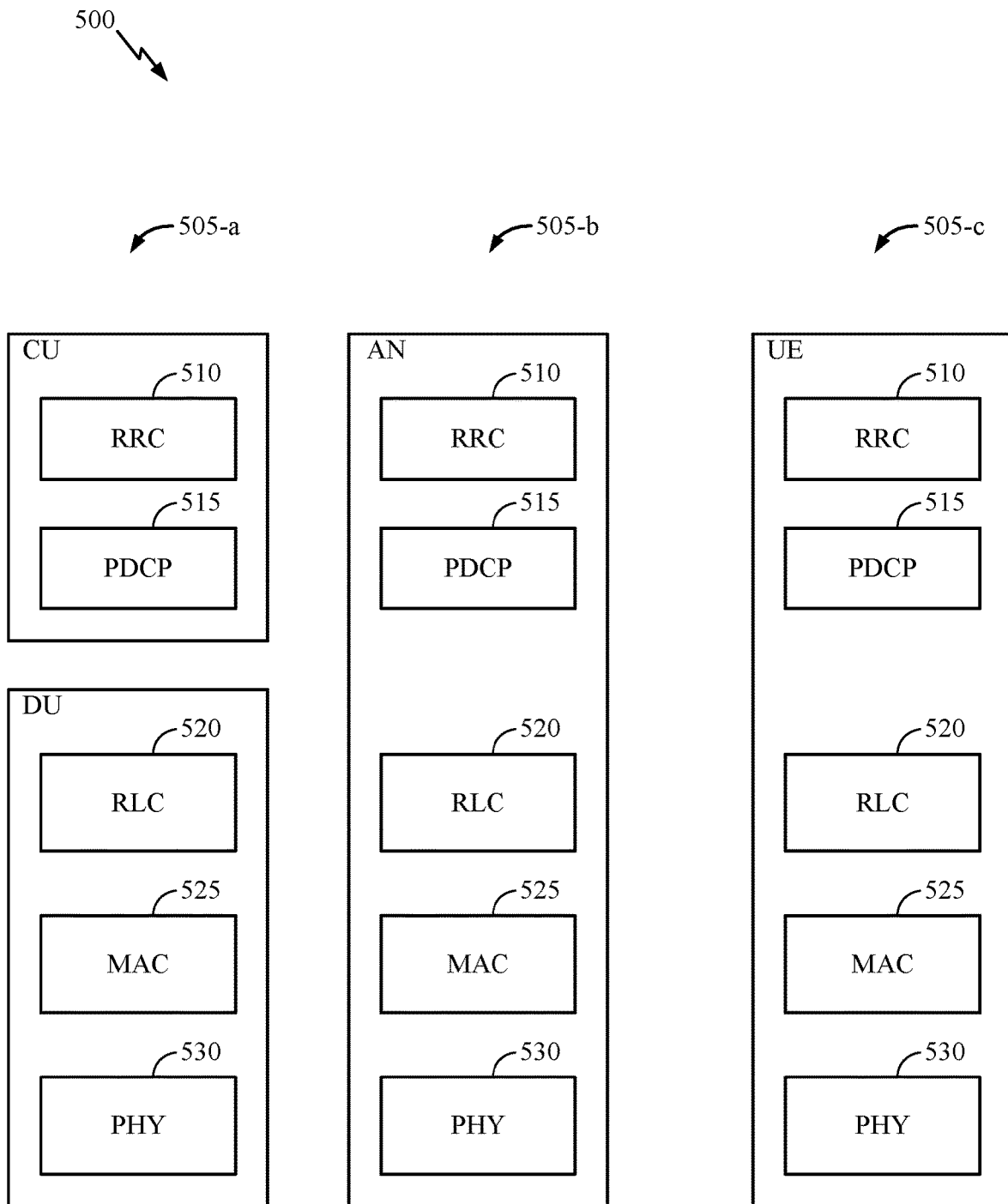
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
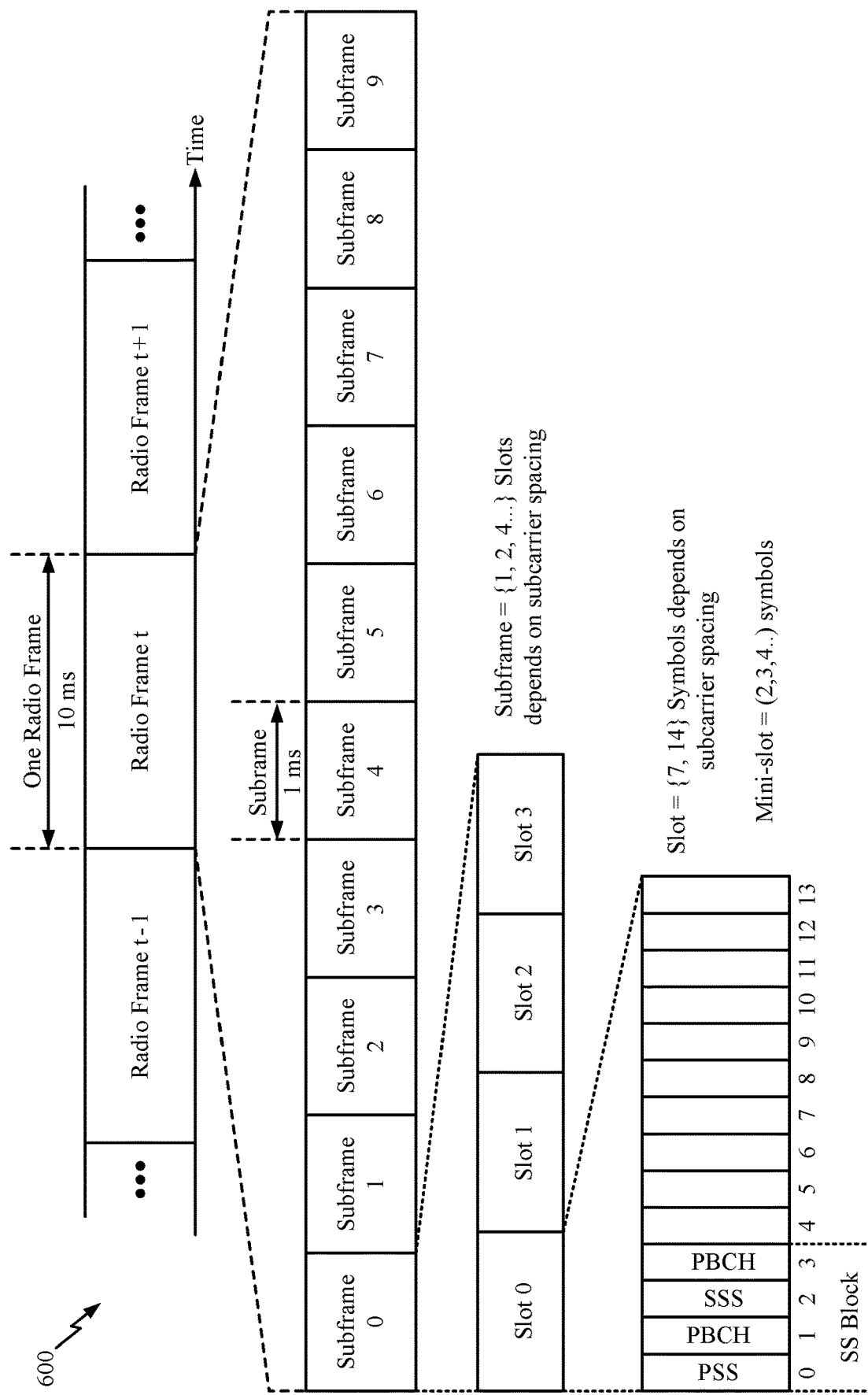
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 7:
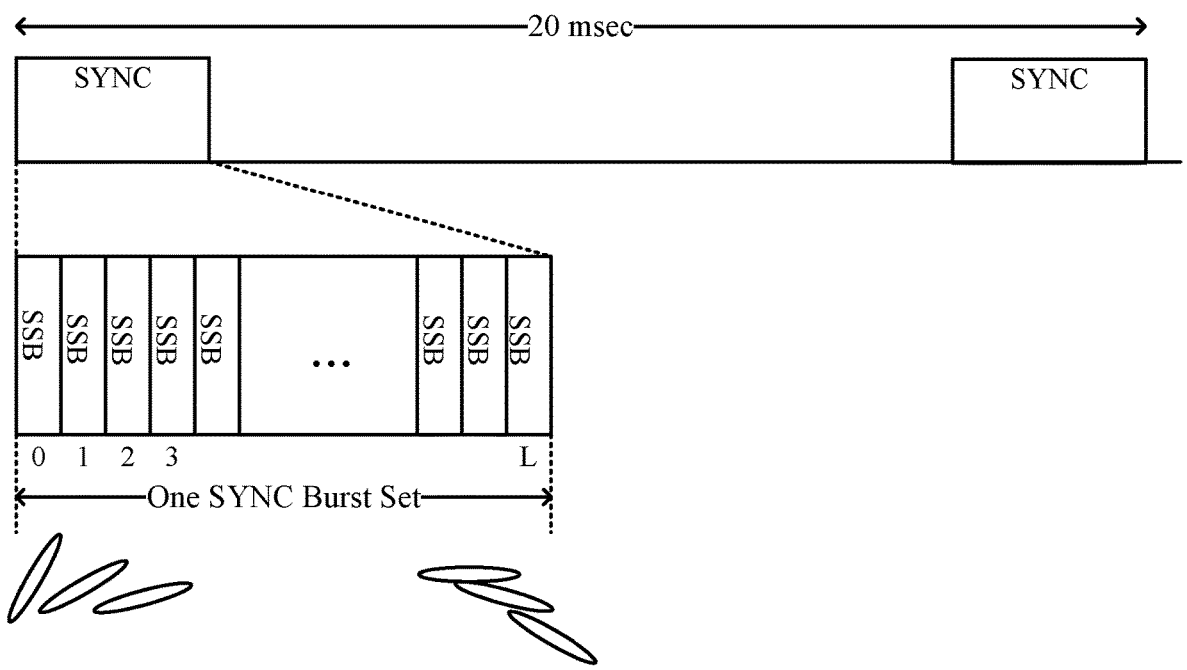
FIG. 7 illustrates how different synchronization signal blocks (SSBs) may be sent using different beams, in accordance with certain aspects of the present disclosure.

As shown in FIG. 7, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 8:
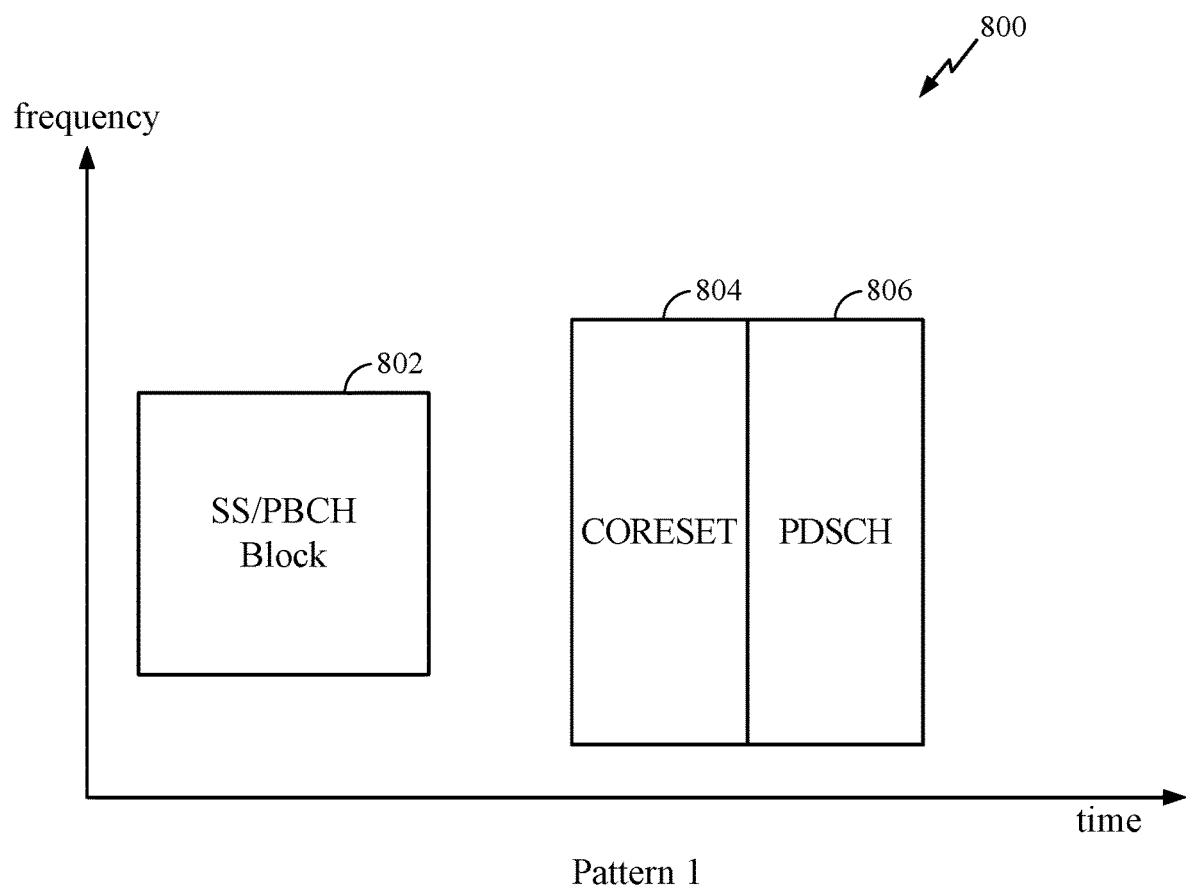
FIG. 8 shows an exemplary transmission resource mapping, according to aspects of the present disclosure.

FIG. 8 shows an exemplary transmission resource mapping 800, according to aspects of the present disclosure. In the exemplary mapping, a BS (e.g., BS 110a, shown in FIG. 1) transmits an SS/PBCH block 802. The SS/PBCH block includes a MIB conveying an index to a table that relates the time and frequency resources of the CORESET 804 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 806. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

QCL Port and TCI States

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signalling, while a UE may be signaled to decode PDSCH according to a detected PDCCH with DCI indicating one of the TCI states. Each configured TCI state may include one RS set TCI-RS-SetConfig that indicates different QCL assumptions between certain source and target signals.

Figure 9:
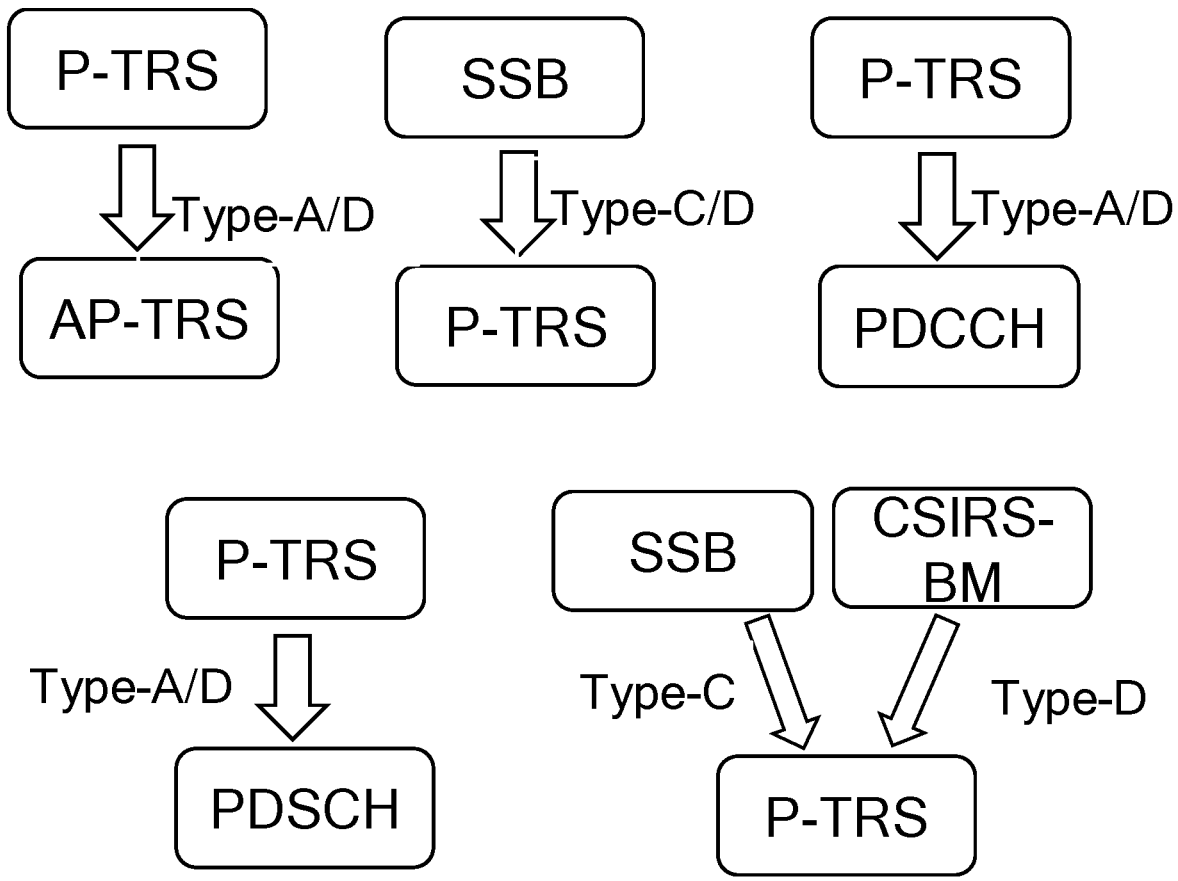
FIG. 9 illustrates example quasi co-location (QCL) relationships, in accordance with certain aspects of the present disclosure.

FIG. 9 illustrate examples of the association of DL reference signals with corresponding QCL types that may be indicated by a TCI-RS-SetConfig.

In the examples of FIG. 9, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSIRS, TRS, and SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 9, for the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},

QCL-TypeB: {Doppler shift, Doppler spread},

QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

An initial CORESET (e.g., CORESET ID 0 or simply CORESET #0) in NR may be identified during initial access by a UE (e.g., via a field in the MIB). A ControlResourceSet information element (CORESET IE) sent via radio resource control (RRC) signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and Transmission Configuration Indicator (TCI) states.

As noted above, a subset of the TCI states provide quasi co-location (QCL) relationships between DL RS(s) in one RS set (e.g., TCI-Set) and PDCCH demodulation RS (DMRS) ports. A particular TCI state for a given UE (e.g., for unicast PDCCH) may be conveyed to the UE by the Medium Access Control (MAC) Control Element (MAC-CE). The particular TCI state is generally selected from the set of TCI states conveyed by the CORESET IE, with the initial CORESET (CORESET #0) generally configured via MIB.

Search space information may also be provided via RRC signaling. For example, the SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is generally configured via PBCH (MIB). Example Spatial QCL indication for initial CORESET and DL BWP Including configuration information for CORESET #0 in a master information block (MIB) may allow a UE to efficiently identify the configuration by monitoring SSBs. As a result, CORESET #0 may be used to efficiently configure a UE for optimal communication, for example, by activating various uplink and downlink BWPs.

As will be described in greater detail below, however, there are certain challenges presented when communicating with a UE in CORESET #0 and on an initial DL BWP. These challenges can stem from a possible ambiguity in spatial QCL assumptions for such transmissions. In other words, in cases where a pool of candidate beams for PDCCH transmissions in CORESET #0 are not be pre-configured, a UE may have to take steps to determine what beam to assume for PDCCH space search monitoring.

One aspect of CORESET #0 is that, unlink other CORESETs, the interpretation of the TCI state and time domain configuration may change from UE to UE, based on the SSB index which is used for initial access. As noted above, each SSB may be transmitted with a different beam and, as such, each SSB index may inherently include spatial QCL/beam-related information and may be mapped to a different PDCCH search space.

One potential challenge is how to indicate spatial QCL (beam-related) information for CORESET #0 so that a UE and gNB are operating under the same assumptions. Without dedicated (e.g., UE-specific) signaling, a UE may be challenged to determine what resources (e.g., time, frequency, and beam) to monitor for a PDCCH transmission in CORESET #0 on an initial downlink BWP.

There are various options for indicating QCL assumptions for CORESET #0. According to a first option, QCL assumptions are indicated by a TCI state configured for CORESET #0. In this case, When the CORESET ID field is 0, the TCI state ID field in the MAC-CE indicates a TCI-state in the PDSCH-Config. For CORESET #0, a UE may follow the indicated TCI state or the QCL-D state of the SSB which is selected at least through the random access procedure for handover, whichever is most recent.

In some cases, the MAC CE-based TCI indication delay for CORESET #0 may be the same as the MAC CE-based TCI indication delay for other CORESETs. A UE may be expected to be configured only with TCI state of CSI-RS/TRS which is QCL'd with an SSB based on the corresponding QCL type (e.g., defined in a standard).

If different reference signals are configured in the TCI state, these should be QCL'd with the same SSB with corresponding QCL type. It may be left up to the network (NW) and/or base station (BS) whether to indicate the TCI-state for the CORESET #0 by MAC-CE. If the TCI-state for CORESET #0 is not indicated via MAC-CE, the UE may apply some rule. For example, the UE may follow the SSB selected in the most recent RA procedure to receive any PDCCH with any RNTI on CORESET #0.

When the UE is in RRC connected mode, for a CORESET other than CORESET #0, a MAC-CE may indicate a TCI-state in the PDSCH-Config RRC IE (subject to any restrictions of the TCI-state indexes configured for the CORESET RRC IE). It is generally a BS's responsibility whether (or how) to ensure the performance of broadcast PDCCH whose QCL-TypeD is TRS.

According to a second option, spatial QCL assumptions for CORESET #0 may be indicated by an SSB index conveyed via a MAC-CE for CORESET #0. In this case, when the CORESET ID field is 0, the TCI state ID field in the MAC-CE indicates an SSB index. A UE may follow the indicated SSB or an SSB which is selected through the random access procedure, whichever is the most recent. For this second option, when the ra-SearchSpace is associated to the CORESET #0, CSI-RS based RA is not supported. As such, beam failure detection (BFD) of CORESET #0 may not be required.

With this second option, it may be up to NW whether to use the same beam as for SSB or a narrower beam to transmit a PDCCH on the CORESET #0. If an indicated SSB has an associated TRS/CSI-RS, it may be up to the UE whether to use the associated TRS/CSI-RS as the QCL source for the CORESET #0.

However, there may be a need for some definition to effectively limit the number of active DL beams, especially when selected TCI states for PDCCH and PDSCH contain A-CSI-RS.

In some cases, indication of spatial QCL assumptions may depend on an option used for bandwidth part (BWP) allocation (e.g., which DL BWP is active for a DL transmission in CORESET #0).

According to a first BWP allocation option, an initial downlink BWP is configured for a UE, with the initial DL BWP following a configuration indicated in MIB and without a UE-specific IE. In other words, in this option a UE-specific IE such as PDSCH-Config, tci-StatesToAddModList, and the like, may be lacking. In this case, the initial BWP (BWP ID #0) may be configured with bwp-Common while an additional BWP (e.g., BWP ID #1) may be configured with bwp-Common and bwp-Dedicated.

According to a first BWP allocation option, the initial DL BWP for the UE can be reconfigured as a UE-specific BWP with UE-specific IE. In this case, the initial BWP (e.g., Id #0) may be configured with bwp-Common and bwp-Dedicated, where bwp-Dedicated may include PDSCH-config with TCI-states. An additional BWP (e.g., Id #1) may be configured with bwp-Common and bwp-Dedicated.

There is at least one potential issue for the first BWP allocation option described above. For example, a UE may be unclear of spatial QCL assumptions if the initial DL BWP activated does not have a dedicated IE and, hence, no PDSCH-Config for TCI state of CORESET #0 (in the case of the first option for QCL indication of CORESET #0). As a result, the UE may not know what beam to use and/or what search space to monitor for DL transmission in CORESET #0 on the initial DL BWP. This may lead to less than optimal processing (e.g., unnecessarily monitoring certain search spaces and/or candidate beams) which may lead to reduced performance and/or power consumption.

Aspects of the present disclosure, however, provide techniques that may help a UE and gNB clarify which spatial QCL assumptions (configured TCI states) to apply for DL transmissions in a first CORESET on a BWP for which the UE lacks explicit signaling of TCI states. For example, the techniques may effectively define a set of rules a UE may apply to determine what QCL assumptions to apply when monitoring for a PDCCH transmission in CORESET #0 on an initial DL BWP with no UE-specific PDSCH-Config and/or tci-StatesToAddModList. With knowledge of how a UE will determine what QCL assumptions to apply in such scenarios, a gNB can perform transmissions accordingly. For example, given knowledge of how a UE will determine QCL assumptions, a gNB may determine what transmission beam(s) to use for transmitting a PDCCH to a UE in (CORESET/BWP) scenarios where there is no dedicated (UE-specific) signaling for a UE (e.g., as the UE does not yet have a dedicated ID).

Figure 10:
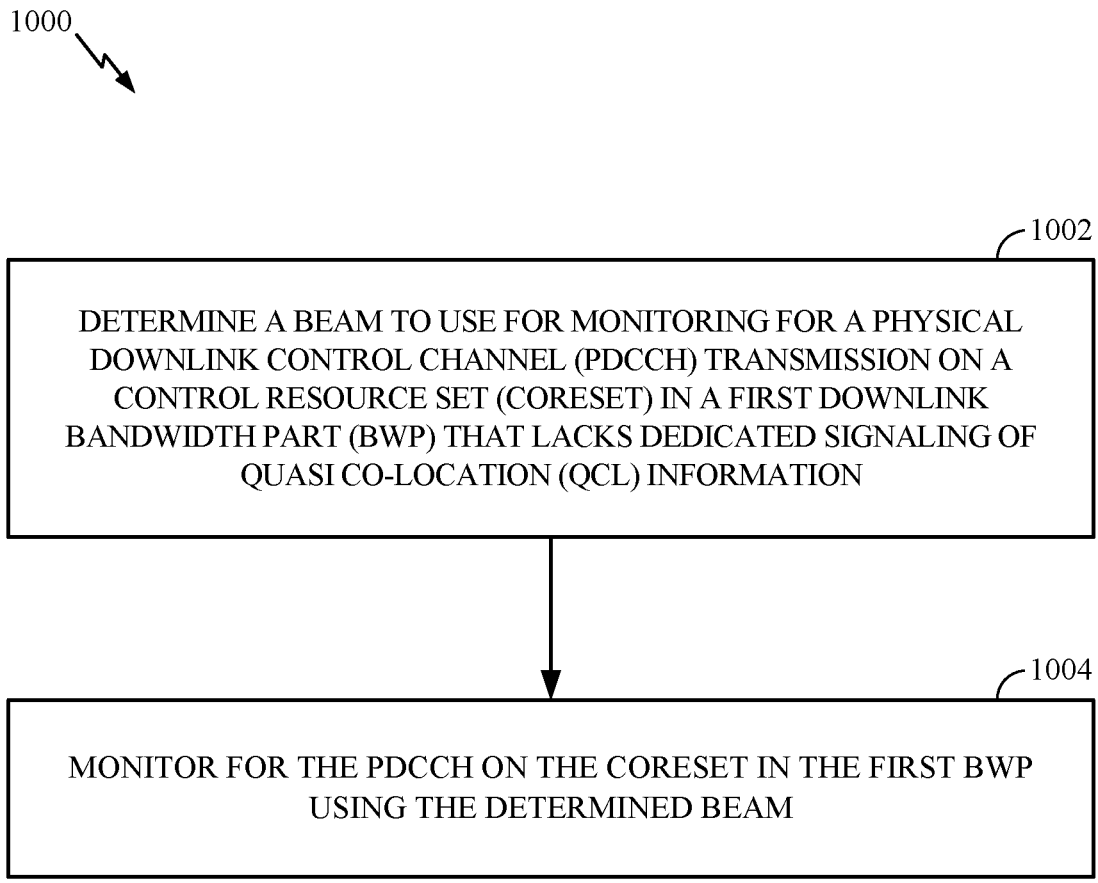
FIG. 10 illustrates example operations for wireless communications by a user equipment (UE), in accordance with certain aspects of the present disclosure.

FIG. 10 illustrates example operations 1000 for wireless communications by a UE, in accordance with certain aspects of the present disclosure. For example, operations 1000 may be performed by a UE 120 of FIG. 1 to determine spatial QCL information for use in processing a downlink transmission in an initial CORESET (e.g., CORESET #0) on an initial BWP.

Operations 1000 begin, at 1002, by determining a beam to use for monitoring for a physical downlink control channel (PDCCH) transmission on a control resource set (CORESET) in a first downlink bandwidth part (BWP) that lacks dedicated signaling of quasi co-location (QCL) information. For example, the CORESET may be an initial CORESET configured via a MIB (e.g. CORESET #0), while the first DL BWP may be an initial DL BWP for which there is no UE-specific signaling (e.g., of PDSCH-Config, tci-States-ToAddModList). As will be described below, in some cases, the determination may be based on some type of signaling from the gNB. In other cases, the determination may be based on one or more rules applied by the UE.

At 1004, operations can continue via a UE engaging in monitoring. For example, the UE can monitor for the PDCCH on the CORESET in the first BWP. The UE monitoring may occur with a previously determined beam (e.g., determined based on a first or initial BWP).

Figure 11:
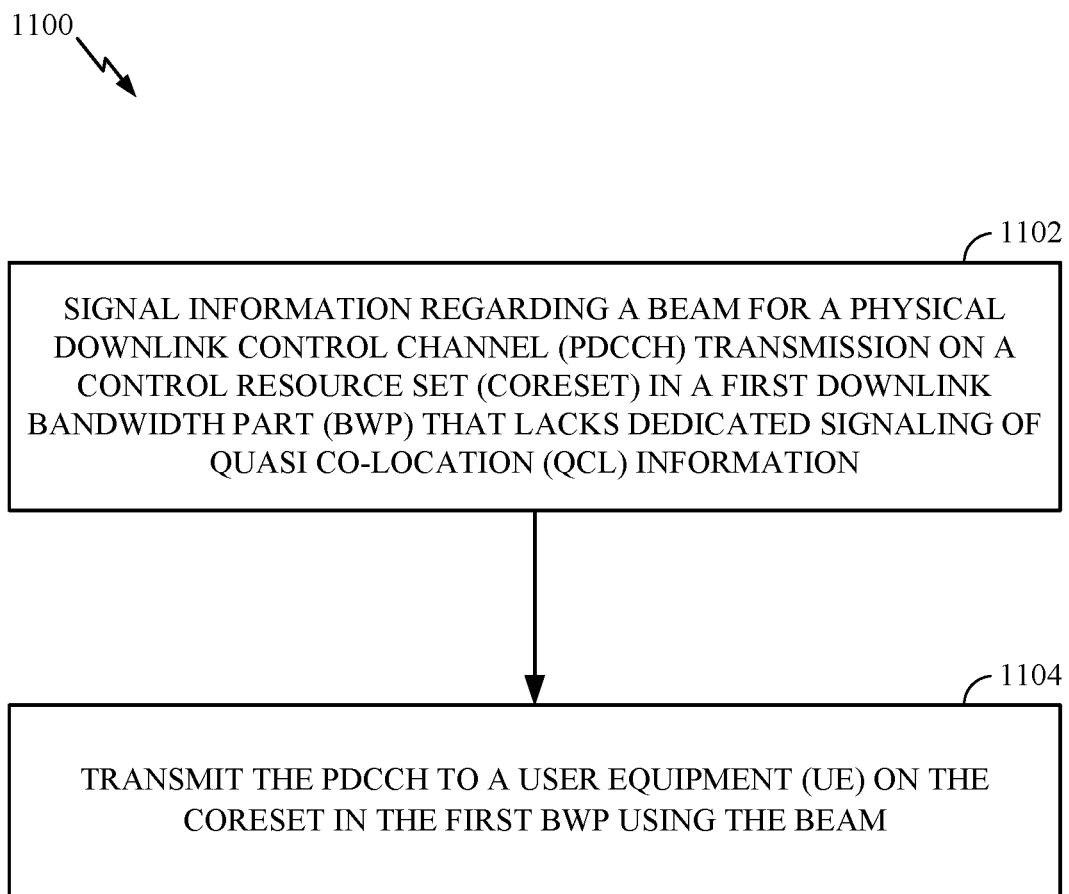
FIG. 11 illustrates example operations for wireless communications by a network entity, in accordance with certain aspects of the present disclosure.

FIG. 11 illustrates example operations 1100 for wireless communications by a network entity, in accordance with certain aspects of the present disclosure. For example, operations 1100 may be performed by a base station 120 of FIG. 1 (e.g., a gNB) to indicate spatial QCL information for a UE to use in processing a downlink transmission in CORESET #0 on an initial BWP.

Operations 1100 begin, at 1102, by signaling information regarding a beam for a physical downlink control channel (PDCCH) transmission on a control resource set (CORESET) in a first downlink bandwidth part (BWP) that lacks dedicated signaling of quasi co-location (QCL) information.

At 1104, the network entity transmits the PDCCH to a user equipment (UE) on the CORESET in the first BWP using the beam.

The present disclosure provides various solutions to help a UE and gNB clarify the spatial QCL assumptions (configured TCI states) for DL transmissions in CORESET #0 on an Initial DL BWP. For example, a UE may apply one of the solutions described below to determine what spatial QCL assumptions to apply. The spatial QCL assumptions may effectively serve as a beam indication, an indication to the UE which Tx beam the gNB will use so the UE can determine what receive beam to use (e.g., when monitoring for a PDCCH transmission in CORESET #0 on an initial DL BWP.

A first solution is to avoid the problem by not allowing CORESET #0 to be configured in the initial DL BWP. In other words, this solution may force CORESET #0 to be configured on a (secondary) DL BWP configured as a UE-specific DL BWP with a UE-specific IE (e.g., with PDSCH-config with TCI-states). With this solution, rather than allowing the initial DL BWP to be activated for CORESET #0 (and later activating a secondary BWP configured as a UE-specific DL BWP), activation of the initial DL BWP for CORESET #0 may be prohibited until the UE is able to be otherwise configured with TCI states for the initial DL BWP.

A second solution for the first BWP allocation option described above is for CORESET #0, in the initial DL BWP, to use the PDSCH-Config for a reference DL BWP that has a dedicated IE. In other words, the UE may obtain the beam/spatial QCL information from the PDSCH-Config for this other DL BWP. In some cases, the NW may signal a fixed DL BWP to use for this purpose or this reference DL BWP may be defined in a standard. In some cases, the reference DL BWP may be a DL BWP with the lowest BWP ID that has a PDSCH-Config.

A third solution, for the first BWP allocation option is to provide additional (broadcast) signaling for spatial QCL assumptions for the initial DL BWP. For example, this signaling may be via PDSCH-Config or tci-StatesToAddModList configured for the initial DL BWP via a PDCCH-ConfigSIB1.

A fourth solution is, in effect, to provide similar signaling for CORESET #0 as other CORESETs. For example, CORESET #0 may be allowed to have a ControlResourceSet IE, instead of using PDSCH-Config. The broadcast IE for CORESET #0 may indicate which TCI states to apply to CORESET #0.

A fifth solution is to effectively restrict the first option for QCL indication of CORESET #0 only to the second option for BWP allocation. In other words, in the case that QCL is indicated by TCI states configured for CORESET #0, the initial DL BWP can be reconfigured as a UE-specific BWP with a UE-specific IE.

A sixth solution, in case the initial DL BWP has no PDSCH-Config (e.g., per the first option for initial DL BWP allocation), is for QCL of CORESET 0 to be indicated by an SSB index. For example, such an SSB index may be provided in a MAC-CE, in a similar manner as the second option for QCL indication of CORESET 0. Absent such an SSB index, QCL of CORESET 0 may be indicated by a TCI state in MAC-CE (e.g., according to the first option for QCL indication of CORESET 0).

According to this sixth option, the 7 bits of TCI the State ID in the MAC-CE may refer to a TCI-stateId configured in PDSCH-Config, if PDSCH-Config is configured for the BWP containing this CORESET ID. Otherwise, the 7 bits of the TCI State ID may refer to an SSB-Index.

A seventh solution, in case the initial DL BWP has no PDSCH-Config (e.g., per the first option for initial DL BWP allocation) is to indicate the QCL of CORESET 0 via the RACH procedure. In other words, the QCL of CORESET #0 may be indicated by an SSB selected by the UE in a previous RACH procedure. The UE may use a beam corresponding to this same SSB for CORESET #0, so it may not need to rely on a preconfigured TCI state.

Figure 12:
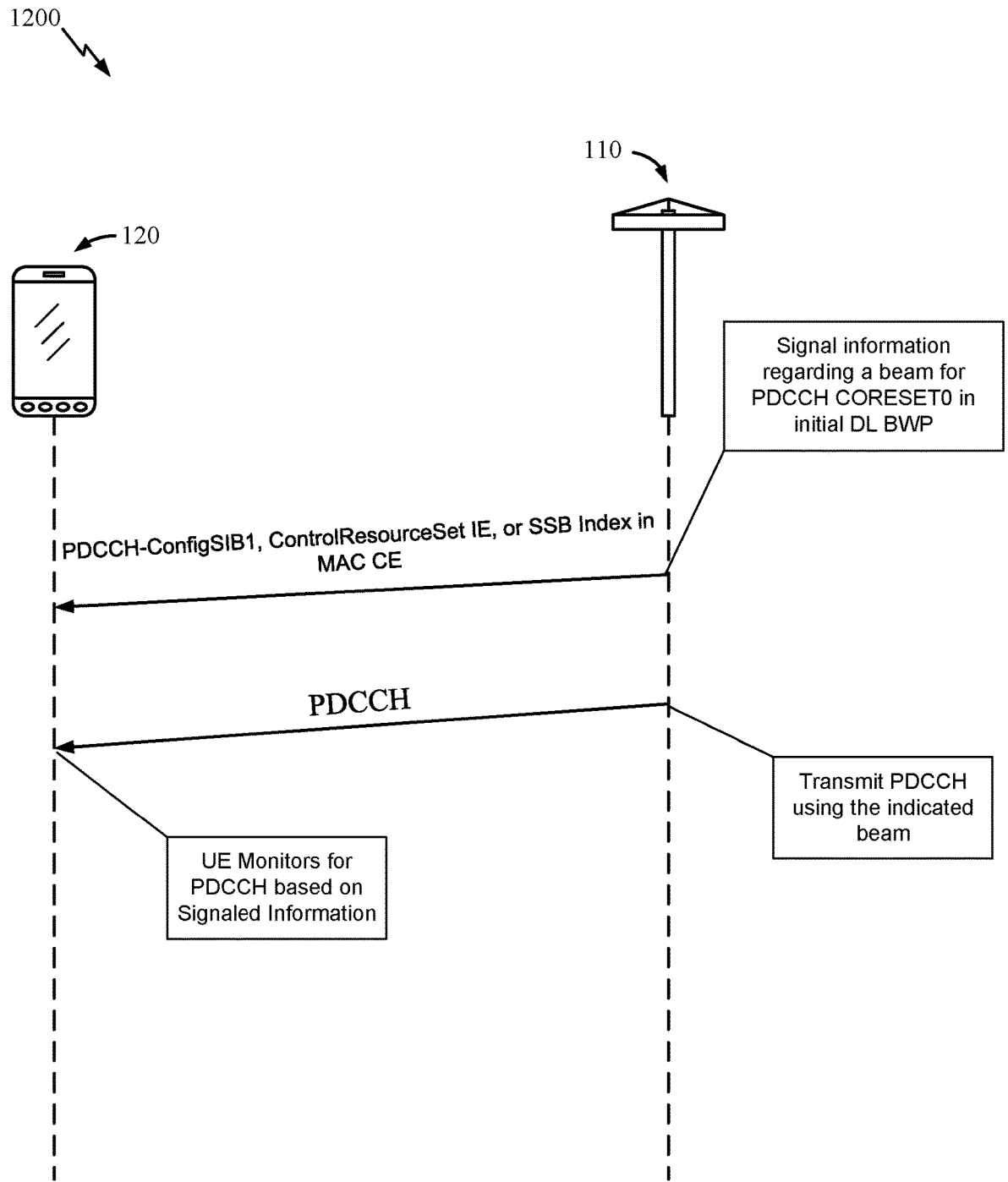
FIG. 12 shows a call flow diagram illustrating aspects of the present disclosure.

FIG. 12 shows a call flow diagram illustrating how a gNB 110 may provide signaling that helps help a UE 120 and the gNB clarify the spatial QCL assumptions (configured TCI states) for DL transmissions in CORESET #0 on an Initial DL BWP, in accordance with aspects of the present disclosure.

As illustrated, the gNB 110 may signal information regarding a beam for PDCCH CORESET0 in an initial DL BWP. For example, according to the third or fourth solutions described above, the gNB may signal the information via broadcast signaling (e.g., via a PDCCH-ConfigSIB1 or a ControlResourceSet IE). As another example, the gNB may signal the information as an SSB Index in a MAC CE. As a result, the information received according to these options may effectively serve as a beam indication, allowing the UE to know what transmit the gNB is to use and what receive beam to use when monitoring for a PDCCH transmission in CORESET #0 on an initial DL BWP.

EXAMPLE EMBODIMENTS

Embodiment 1

A method of wireless communications by a User Equipment (UE), comprising determining a beam to use for monitoring for a physical downlink control channel (PDCCH) transmission on a control resource set (CORESET) in a first downlink bandwidth part (BWP), wherein the first DL BWP lacks dedicated signaling of quasi co-location (QCL) information for the UE and monitoring for the PDCCH on the CORESET in the first BWP using the determined beam.

Embodiment 2

The method of Embodiment 1, wherein the CORESET comprises an initial CORESET configured via a master information block (MIB).

Embodiment 3

The method of any of Embodiments 1-2, wherein the determination is based on dedicated signaling of QCL information for a second downlink BWP.

Embodiment 4

The method of Embodiment 3, wherein the second downlink BWP comprises a downlink with a lowest BWP identifier that has dedicated signaling of QCL information.

Embodiment 5

The method of any of Embodiments 1-4, wherein the determination is based on broadcast signaling of QCL information provided via a PDCCH configuration system information block (SIB).

Embodiment 6

The method of any of Embodiments 1-5, wherein the determination is based on QCL information provided in a CORESET information element (IE) for the CORESET.

Embodiment 7

The method of any of Embodiments 1-6, wherein the determination is based on QCL information provided with a reconfiguration of the first downlink BWP as a UE-specific BWP.

Embodiment 8

The method of any of Embodiments 1-7, wherein the determination is based on QCL information for the CORESET provided via a synchronization signal block (SSB) index in a media access control (MAC) control element (CE).

Embodiment 9

The method of any of Embodiments 1-8, further comprising basing the determination on information obtained via a previous random access channel (RACH) procedure.

Embodiment 10

A method of wireless communications by a network entity, comprising signaling information regarding a beam for a physical downlink control channel (PDCCH) transmission on a control resource set (CORESET) in a first downlink bandwidth part (BWP) that lacks dedicated signaling of quasi co-location (QCL) information and transmitting the PDCCH to a user equipment (UE) on the initial CORESET in the initial BWP using the beam.

Embodiment 11

The method of Embodiment 10, wherein the CORESET comprises an initial CORESET configured via a master information block (MIB).

Embodiment 12

The method of any of Embodiments 10-11, wherein the signaling comprises broadcast signaling of QCL information provided via a PDCCH configuration system information block (SIB).

Embodiment 13

The method of any of Embodiments 10-12, wherein the signaling comprises signaling of QCL information in a CORESET information element (IE) for the CORESET.

Embodiment 14

The method of any of Embodiments 10-13, wherein the signaling comprises signaling of QCL information for the CORESET via a synchronization signal block (SSB) index in a media access control (MAC) control element (CE).

Embodiment 15

An apparatus for wireless communications by a User Equipment (UE), comprising means for determining a beam to use for monitoring for a physical downlink control channel (PDCCH) transmission on a control resource set (CORESET) in a first downlink bandwidth part (BWP), wherein the first DL BWP lacks dedicated signaling of quasi co-location (QCL) information for the UE and means for monitoring for the PDCCH on initial CORESET in the first BWP using the determined beam.

Embodiment 16

The apparatus of Embodiment 15, wherein the CORESET comprises an initial CORESET configured via a master information block (MIB).

Embodiment 17

The apparatus of any of Embodiments 15-16, wherein the determination is based on dedicated signaling of QCL information for a second downlink BWP.

Embodiment 18

The apparatus of Embodiment 17, wherein the second downlink BWP comprises a downlink with a lowest BWP identifier that has dedicated signaling of QCL information.

Embodiment 19

The apparatus of any of Embodiments 15-18, wherein the determination is based on broadcast signaling of QCL information provided via a PDCCH configuration system information block (SIB).

Embodiment 20

The apparatus of any of Embodiments 15-19, wherein the determination is based on QCL information provided in a CORESET information element (IE) for the CORESET.

Embodiment 21

The apparatus of any of Embodiments 15-20, wherein the determination is based on QCL information provided with a reconfiguration of the first downlink BWP as a UE-specific BWP.

Embodiment 22

The apparatus of any of Embodiments 15-21, wherein the determination is based on QCL information for the CORESET provided via a synchronization signal block (SSB) index in a media access control (MAC) control element (CE).

Embodiment 23

The apparatus of any of Embodiments 15-22, further comprising means for basing the determination on information obtained via a previous random access channel (RACH) procedure.

Embodiment 24

An apparatus for wireless communications by a network entity, comprising means for signaling information regarding a beam for a physical downlink control channel (PDCCH) transmission on a control resource set (CORESET) in a first downlink bandwidth part (BWP) that lacks dedicated signaling of quasi co-location (QCL) information and means for transmitting the PDCCH to a user equipment (UE) on the initial CORESET in the initial BWP using the beam.

Embodiment 25

The apparatus of Embodiment 24, wherein the CORESET comprises an initial CORESET configured via a master information block (MIB).

Embodiment 26

The apparatus of any of Embodiments 24-25, wherein the signaling comprises broadcast signaling of QCL information provided via a PDCCH configuration system information block (SIB).

Embodiment 27

The apparatus of any of Embodiments 24-26, wherein the signaling comprises signaling of QCL information in a CORESET information element (IE) for the CORESET.

Embodiment 28

The apparatus of any of Embodiments 24-27, wherein the signaling comprises signaling of QCL information for the CORESET via a synchronization signal block (SSB) index in a media access control (MAC) control element (CE).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), the method comprising:
   determining, for monitoring for a physical downlink control channel (PDCCH) transmission on an initial control resource set (CORESET) having a CORESET identifier of 0 in an initial downlink (DL) bandwidth part (BWP) having a BWP identifier of 0, quasi co-location (QCL) information from physical downlink shared channel (PDSCH) configuration information for a reference DL BWP; and
   monitoring for the PDCCH transmission on the initial CORESET in the initial DL BWP using the determined QCL information.

2. The method of claim 1, wherein the initial CORESET is configured via a master information block (MIB).

3. The method of claim 1, wherein the reference DL BWP is a fixed DL BWP.

4. The method of claim 1, wherein the reference DL BWP has a lowest BWP identifier that has dedicated signaling of the QCL information.

5. A method of wireless communication by a network entity, the method comprising:
   signaling, based on a first downlink (DL) bandwidth part (BWP) of a control resource set (CORESET) lacking dedicated signaling of quasi co-location (QCL) information for a user equipment (UE), QCL information in physical downlink shared channel (PDSCH) configuration information for a second DL BWP regarding a beam, the beam for a physical downlink control channel (PDCCH) transmission on the CORESET in the first DL BWP, wherein the QCL information in the PDSCH configuration information is configured to indicate QCL information for determining the beam for the PDCCH transmission on the CORESET in the first DL BWP; and
   transmitting the PDCCH transmission to the UE on the CORESET in the first DL BWP using the beam;
   wherein the second DL BWP is a fixed DL BWP.

6. The method of claim 5, wherein the CORESET comprises an initial CORESET configured via a master information block (MIB).

7. The method of claim 5, wherein signaling the QCL information in the PDSCH configuration information for the second DL BWP regarding the beam comprises dedicated signaling of the QCL information in the PDSCH configuration information for the second DL BWP.

8. The method of claim 7, wherein the QCL information from the PDSCH configuration information for the second DL BWP corresponds to a lowest BWP identifier that has dedicated signaling of QCL information.

9. A user equipment (UE) for wireless communication, the UE comprising:
   a memory; and
   a processor coupled to the memory, wherein the processor is configured to:
   determine, for monitoring for a physical downlink control channel (PDCCH) transmission on an initial control resource set (CORESET) having a CORESET identifier of 0 in an initial downlink (DL) bandwidth part (BWP) having a BWP identifier of 0, quasi co-location (QCL) information from physical downlink shared channel (PDSCH) configuration information for a reference DL BWP; and
   monitor for the PDCCH transmission on the initial CORESET in the initial DL BWP using the determined QCL information.

10. The UE of claim 9, wherein the initial CORESET is configured via a master information block (MIB).

11. The UE of claim 9, wherein the reference DL BWP is a fixed DL BWP.

12. The UE of claim 9, wherein the reference DL BWP has a lowest BWP identifier that has dedicated signaling of the QCL information.

13. A network entity for wireless communication, the network entity comprising:
   a memory; and
   a processor coupled to the memory, wherein the processor is configured to:
   signal, based on a first downlink (DL) bandwidth part (BWP) of a control resource set (CORESET) lacking dedicated signaling of quasi co-location (QCL) information for a user equipment (UE), QCL information in physical downlink shared channel (PDSCH) configuration information for a second DL BWP regarding a beam, the beam for a physical downlink control channel (PDCCH) transmission on the CORESET in the first DL BWP, wherein the QCL information in the PDSCH configuration information is configured to indicate QCL information for determining the beam for the PDCCH transmission on the CORESET in the first DL BWP; and
   transmit the PDCCH transmission to the UE on the CORESET in the first DL BWP using the beam;
   wherein the second DL BWP is a fixed DL BWP.

14. The network entity of claim 13, wherein the CORESET comprises an initial CORESET configured via a master information block (MIB).

15. The network entity of claim 13, wherein the processor is further configured to perform dedicated signaling of the QCL information in the PDSCH configuration information for the second DL BWP.

16. The network entity of claim 15, wherein the QCL information from the PDSCH configuration information for the second DL BWP corresponds to a lowest BWP identifier that has dedicated signaling of QCL information.

\* \* \* \* \*